W. H. ALBERT.
COMBINED ADVERTISING MEDIUM, CASH VOUCHER, AND TICKET.
APPLICATION FILED JUNE 28, 1916.

1,317,536.    Patented Sept. 30, 1919.

WITNESSES

INVENTOR
Walter H. Albert
BY
ATTORNEYS

UNITED STATES PATENT OFFICE.

WALTER HENRY ALBERT, OF NORTH CALDWELL, NEW JERSEY.

COMBINED ADVERTISING MEDIUM, CASH-VOUCHER, AND TICKET.

1,317,536.  Specification of Letters Patent.  Patented Sept. 30, 1919.

Application filed June 28, 1916. Serial No. 106,353.

*To all whom it may concern:*

Be it known that I, WALTER H. ALBERT, a citizen of the United States, and a resident of North Caldwell, in the county of Essex and State of New Jersey, have invented a new and Improved Combined Advertising Medium, Cash-Voucher, and Ticket, of which the following is a full, clear, and exact description.

The invention relates to advertising mediums which include a cash voucher and ticket.

The object of the present invention is to provide a new and improved combined advertising medium, cash voucher and ticket more especially designed for use by railroads and other transportation companies using tickets for transportation or for use by theaters and other establishments using tickets for admission, the combined advertising medium, cash voucher and ticket being arranged to enable the patrons of railways, theaters and the like to obtain a predetermined cash discount on each combined advertising medium, voucher and ticket bought, to enable the advertiser to reach a large number of persons at a comparatively small cost, and to make it remunerative to the issuing concern.

In order to accomplish the desired result, use is made of a carrier in the form of a sheet of paper, a cash voucher on the said carrier, and, at least, one advertisement on the said carrier, and a ticket detachable on the said voucher and of a value of which the cash value of the voucher is a fraction.

A practical embodiment of the invention is represented in the accompanying drawings forming a part of this specification, in which similar characters of reference indicate corresponding parts in both views.

Figure 1:
Figure 2:
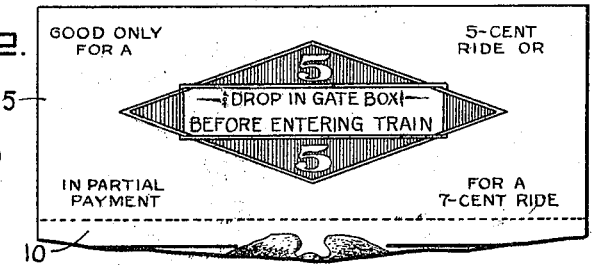

Figure 1 is a plan view of the obverse face of the combined advertising medium, cash voucher and ticket; and Fig. 2 is a plan view of the reverse face of the ticket and a portion of the advertising medium and voucher.

In order that the combined advertising medium, cash voucher and ticket produces the desired result, the following plan briefly stated is followed: An operating party contracts with one or more advertisers to display their advertisements on a stated number of combined advertising media, cash vouchers and tickets, say at a stipulated price, payable preferably to a trust company which holds the money in trust to secure the payments of the cash value vouchers. The operating company next, by itself or through an authorized certification agent, issues the combined advertising medium, cash voucher and ticket in series and with the tickets printed according to the requirements of a transportation company, theater or other concern. The combined advertising media, cash vouchers and tickets of a series are then delivered free of charge to such transportation company, theater or other concern. Each combined advertising medium, cash voucher and ticket is sold by the transportation company or other concern to its patrons at the price indicated on the ticket, and the ticket is torn off by a gatekeeper, conductor or other person and is taken care of in the same manner, as now generally practised. The patron retains the combined advertising medium and voucher and as it has a cash value which is a predetermined fraction of the price of the ticket (say a quarter cent for a five-cent ticket) it is to the interest of the patron to retain the advertising medium and voucher and to collect a number thereof and eventually present the same to the operating company in lots (say a 100 or 1,000) for redemption of their full face value, that is, 25¢ for 100 and $2.50 for 1,000.

The advertising medium and voucher comprises a carrier 10, preferably in the form of a sheet of paper, and having produced thereon by printing or engraving, or other similar processes, a cash value voucher, preferably arranged in two portions 11 and 12 disposed at opposite ends of the carrier 10. The voucher portions 11 and 12 are spaced apart to leave a space which is preferably divided into individual fields each containing an advertisement 13, but the entire space may be used for a single advertisement, if desired. The voucher portion 11 contains a cash value statement in the words "25 cents cash per 100 or $2.50 per 1,000" together with the statement that money is held by a trust company to secure the payments of the cash value stated. The portion 11 further contains a time limit and the name of the operating concern together with the facsimile signature of the treasurer of the said concern. It also contains the number of the series and the registry number of the series.

The voucher portion 12 contains a statement as to the cash value of the voucher similar to the one shown in the portion 11, also a time limit and the name of the certification agent together with the facsimile signature of the secretary of the said concern. The voucher also contains the number of the series and the number of the voucher of the advertising medium of the series. The voucher portions 11 and 12 may also be embellished by seals, trade-marks and safeguarded against counterfeiting by water marks and the like.

On one end of the carrier 10 is detachably arranged a ticket 15 which can be torn off along a line of perforations 16 and this ticket 15 admits the patron to the theater or transporation and is of a value of which the cash value of the voucher is a fraction. Thus, as shown in the drawings, the ticket 15 is a five-cent ticket and it bears thereon the usual legends on the obverse and reverse faces of tickets of this kind. When the patron enters the theater or is seated in a car the ticket 15 is detached from the carrier 10 by a gatekeeper, conductor or other person employed for this purpose, but the combined advertising medium and voucher is retained by the patron and is eventually presented to the operating company in lots of 100 or 1,000 for redemption of their face value, that is, 25¢ for 100 and $2.50 for 1,000.

From the foregoing it will seen that the advertiser is benefited by reaching a large number of persons and the issuing concern receives a fair renumeration by the paid for advertisements appearing on the carrier, and it is worth the while for the patrons or the customers to obtain a large number of the carrier owing to the same containing a cash value voucher redeemable by the issuing concern.

Having thus described my invention I claim as new and desire to secure by Letters Patent:

1. A combined advertising medium, voucher and ticket, comprising a carrier in the form of a sheet of paper, a cash value voucher on the said carrier together with at least one advertisement, the said cash value voucher having appearing thereon a cash value, and the cash value voucher being arranged in two portions spaced apart and with the said advertisement appearing between the two voucher portions and a ticket detachable on the said carrier and of a value of which the cash value of the voucher is a fraction.

2. A combined advertising medium, voucher and ticket, comprising a carrier in the form of a sheet of paper, a cash value voucher appearing on the said sheet together with at least one advertisement, said cash value voucher having appearing thereon a cash value, a time limit, a guarantee by the operating party and a certificate by an issuing agent, and a ticket detachable on the said carrier and of a value of which the cash value of the said voucher is a fraction.

3. A combined advertising medium, voucher and ticket, comprising an integral carrier in the form of a sheet of paper, a cash value voucher of the character which consists of obverse and reverse portions, such portions being delineated on the same face of said carrier together with at least one advertisement, said cash value voucher having appearing thereon a cash value, the obverse and reverse portions thereof being spaced from each other and on opposite sides of the advertisement, and a ticket member detachably carried at one end beyond a member of the cash value voucher, said ticket member being of a value of which the cash value of the voucher is a fraction.

WALTER HENRY ALBERT.

Copies of this patent may be obtained for five cents each, by addressing the "Commissioner of Patents, Washington, D. C."